United States Patent [19]

Boodman et al.

[11] Patent Number: 4,787,727

[45] Date of Patent: Nov. 29, 1988

[54] MEANS TO ADJUST EYEGLASSES

[76] Inventors: Leon Boodman, 262 Storm Dr., Holtsville, N.Y. 11742; James P. Malone, 1 Hillside Ave., Rockville, N.Y. 11571

[21] Appl. No.: 898,418

[22] Filed: Aug. 21, 1986

[51] Int. Cl.⁴ .............................................. G02C 5/20
[52] U.S. Cl. .................................... 351/118; 351/119
[58] Field of Search ................. 351/118, 114, 113, 119

[56] References Cited

U.S. PATENT DOCUMENTS

| | | | |
|---|---|---|---|
| 2,503,275 | 4/1950 | Kleinman | 351/118 |
| 3,874,775 | 4/1975 | Lazarus | 351/113 |
| 4,131,340 | 12/1978 | Preston | 351/118 |

FOREIGN PATENT DOCUMENTS 3016258  6/1980  Fed. Rep. of Germany ...... 351/118

Primary Examiner—Rodney B. Bovernick
Assistant Examiner—J. Ryan
Attorney, Agent, or Firm—James P. Malone

[57] ABSTRACT

In a pair of eyeglasses or the type having side members which hook over the user's ear. An adjustment is provided to adjust the length of the side pieces. The adjustment may be screw type adjusting means or ratchet type adjusting means. An adjustment is also provided to adjust a side hinge to vary the pressure of a side piece against the head.

1 Claim, 1 Drawing Sheet

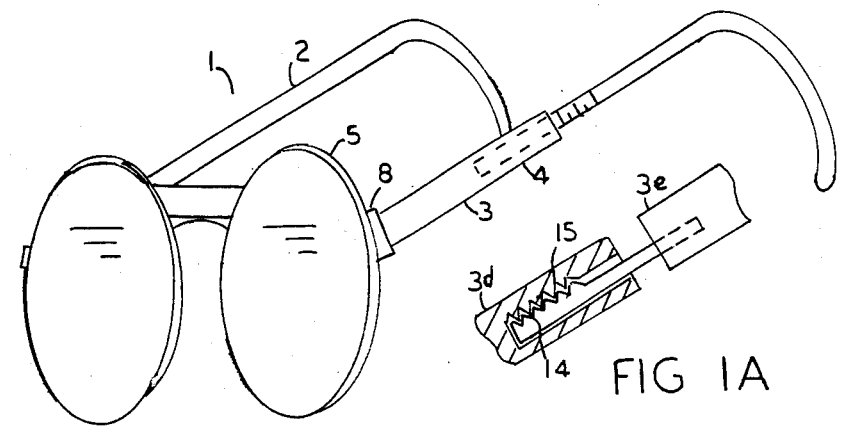
FIG 1
FIG 1A
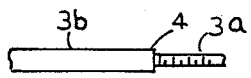
FIG 2
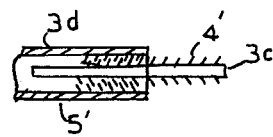
FIG 3
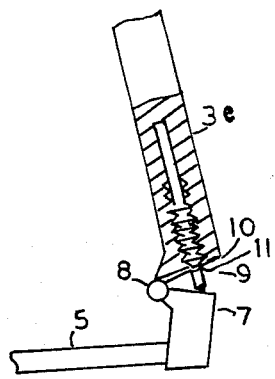
FIG 4

MEANS TO ADJUST EYEGLASSES

TECHNICAL FIELD

This invention relates to eyeglass means and more particularly to means to lengthen the side pieces and means to adjust the hinge of the side pieces.

BACKGROUND

With conventional eyeglasses, there is frequently a need to adjust the side pieces, so they will fit properly on the ear. It is also necessary to adjust the hinges so that the pressure of the side pieces may be varied and adjusted.

It is generally difficult or impossible for the user to make these adjustments and this results in visits to the Optician.

The Invention:

Means to adjust the length of the side pices of eyeglasses comprising screw type adjusting means or ratchet adjusting means. Means are also provided to adjust the closure of the hinges of the side pieces to vary the pressure of the side pieces against the side of the user's head.

OBJECTS OF THE INVENTION

A principal object of the invention is to provide new and improved adjustment means for eyeglasses.

Another object of the invention is to provide new and improved adjustment means for eyeglasses comprising means to adjust the length of the side pieces with either a screw type adjustment or a ratchet adjustment.

Means are also provided to adjust the closure of the hinges of the side pieces in order to vary the pressure of the side pieces against the user's head.

These and other objects of the invention will be apparent from the following specification and drawings of which:

BRIEF DESCRIPTION OF THE DRAWINGS

FIG. 1 is a perspective view for a pair of eyeglasses having means to adjust the length of the side pieces.

FIG. 1A is a detail view of FIG. 1.

FIG. 2 is a detail view of a screw type adjustment.

FIG. 3 is a detail view of ratchet type adjustment.

FIG. 4 is a top view of hinge adjustment for adjusting the pressure of the side pieces against the user's head.

BEST MODE OF THE INVENTION

Referring to the drawings, a pair of conventional eye-glasses 1, is shown having side pieces 2, 3. In order to adjust the length of the side pieces to make them fit behind the ears, adjustment means 4 are provided.

Referring to FIG. 2, one part of the side piece 3a is threaded so as to screw into complementary threads to the other side of the side piece 3b. In order to make the adjustment, the part 3b is held in the hand and the part 3a contains the earpiece. Part 3a is rotated into part 3b is order to adjust the length of the side pieces and improve the fit of the side pieces against the ears. The thread fit is made relatively tight so that the adjustment may be made secure.

FIG. 3 shows another embodiment of the side pieces adjustment wherein the earpiece member 3c has a plurality of barbs or angled projections 4'. The forward part of the side pieces 3d has a shaftway which also has barbs or projections 5. To make the adjustment, the side piece 3c is inserted into the part 3d where the projections 4 will engage the projection 5' at the properly chosen length. If it is desired to lengthen the side pieces, the member 3c may be rotated to withdraw it from the member 3d. The barbs from projections 4', 5', are formed of short stiff wire and are flexible.

FIG. 4 shows a top view of a hinge adjustment. The eyeglass member 5 has a hinge piece 7, and the side piece 3e, is also connected to the hinge 8. When the hinge is rotated, there is a gap 9 formed between the hinge members 7 and 10. In making the adjustment, this gap is varied by means of the screw 11, which is threaded into side piece 3e. The thread fit is made relatively tight so that the adjustment may be made secure.

The position of the screw 11 may be indexed by rotating screw 11. Alternatively, the adjustment may be made by mounting the screw 11 in a manner similar to the lead in a conventional mechanical pencil or in other conventional arrangements.

FIG. 1A shows a detail view of FIG. 1 using a wave-shaped spring 14 which fits into notches 15 on the side piece member 3d. The other side piece member 3e has a post fixedly mounted to it so that by moving the member 3e axially, the spring member 14 will engage notches 15 at a predetermined point for the proper adjustment of the length of the side piece.

It is claimed:

1. In a pair of eyeglasses of the type having a front lens holding member, and side members, which hook over the users ear, each side member being mounted on a hinge,
    means to adjust the length of a side member by turning the side member to adjust the pressure of the side member against the head of the user, comprising a threaded shaft mounted in the side member, the end of the shaft bearing against the front member, whereby rotation of the shaft lengthens the end which, in turn, bears against the frame in such a way that the side members are displaced toward the wearer's temples, thereby increasing pressure.

* * * * *